United States Patent [19]

Motoyama et al.

[11] 4,373,172
[45] Feb. 8, 1983

[54] TAPE RECORDER

[75] Inventors: Kazuyasu Motoyama; Toshihiro Nakao, both of Hachioji, Japan

[73] Assignee: Olympus Optical Co., Ltd., Tokyo, Japan

[21] Appl. No.: 156,816

[22] Filed: Jun. 5, 1980

[30] Foreign Application Priority Data

Jun. 13, 1979 [JP] Japan .................. 54-74490

[51] Int. Cl.³ ............... G11B 21/12; G11B 15/04; G11B 5/54; G11B 15/26
[52] U.S. Cl. ..................... 360/105; 360/75; 360/96.4; 360/60
[58] Field of Search ............ 360/105, 75, 96.4, 60

[56] References Cited

U.S. PATENT DOCUMENTS

| | | | |
|---|---|---|---|
| 3,833,922 | 9/1974 | De Bell et al. ................ | 360/105 |
| 4,134,145 | 1/1979 | Motoyama. | |
| 4,149,203 | 4/1979 | Kobayashi et al. . | |
| 4,224,647 | 9/1980 | Umezawa et al. ............. | 360/105 |
| 4,263,626 | 4/1981 | Kobayashi ..................... | 360/75 |
| 4,263,631 | 4/1981 | Takanashi ...................... | 360/105 |

*Primary Examiner*—Robert S. Tupper

*Attorney, Agent, or Firm*—Frishauf, Holtz, Goodman & Woodward

[57] ABSTRACT

A tape recorder comprises a control motor disposed separately of a tape driving motor and controlled by a control switch; a cam shaft to which the driving force of the control motor is transmitted; a head support plate for supporting a magnetic head, and a pinch roller or the like and which is movable between a first position in which the magnetic head is in contact with the magnetic tape and the tape is clamped between the pinch roller and the capstan shaft and a second position in which the magnetic head is not in contact with the tape and the tape is not clamped between the pinch roller and the capstan shaft; a biasing member for biasing the head support plate toward the first position; and a press cam secured to the cam shaft and to which a support plate is biased by the biasing force of the biasing member. The press cam, by its unitary rotation with the cam shaft, controls the position of the head support plate against the biasing force of the biasing member. The tape recorder further comprises a control cam secured to the cam shaft and coupled to the control switch to change over the control switch by unitary rotary rotation with the cam shaft and the press cam.

12 Claims, 19 Drawing Figures

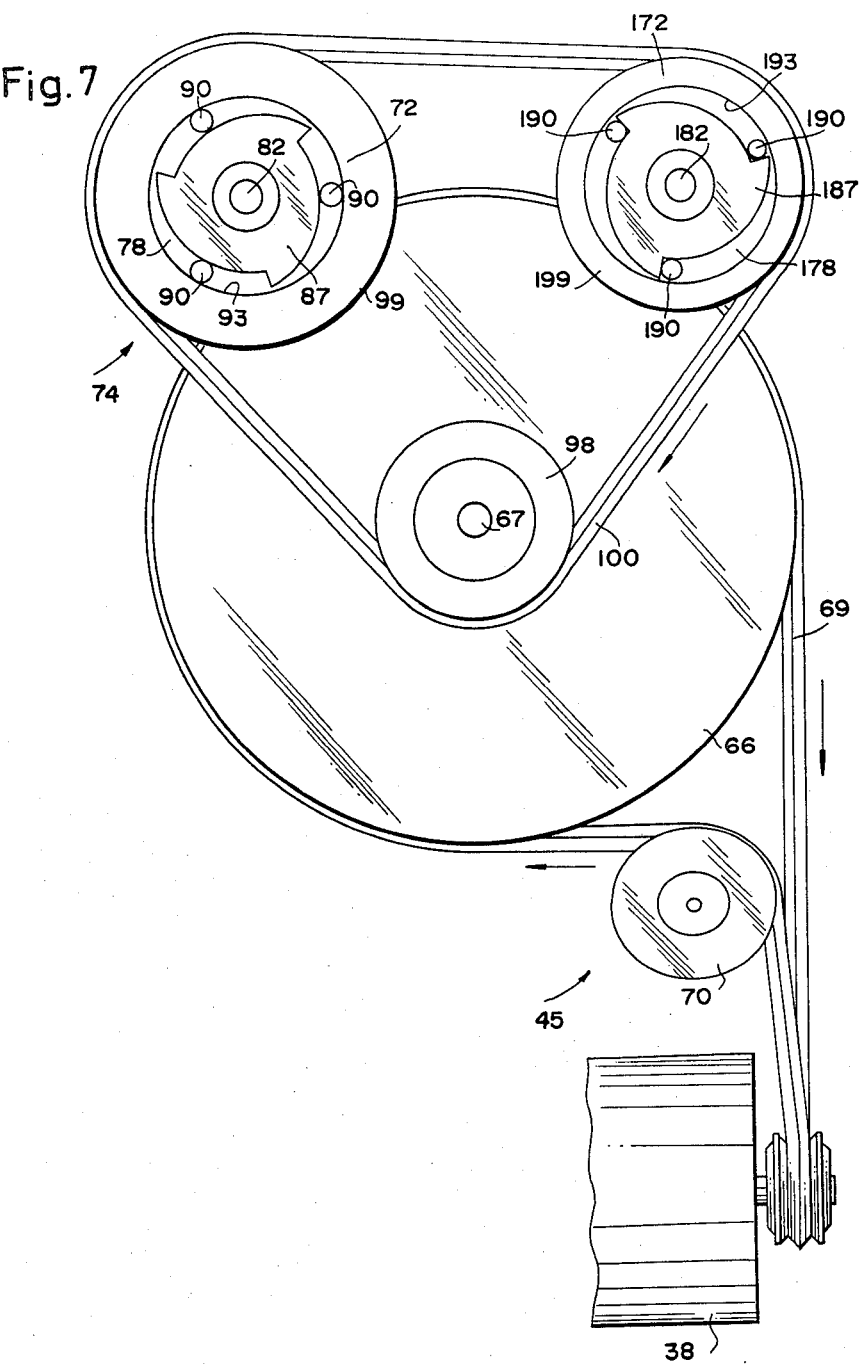

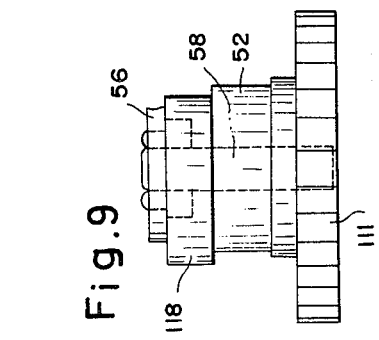
Fig. 9
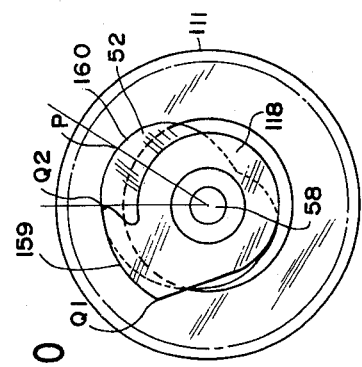
Fig. 10
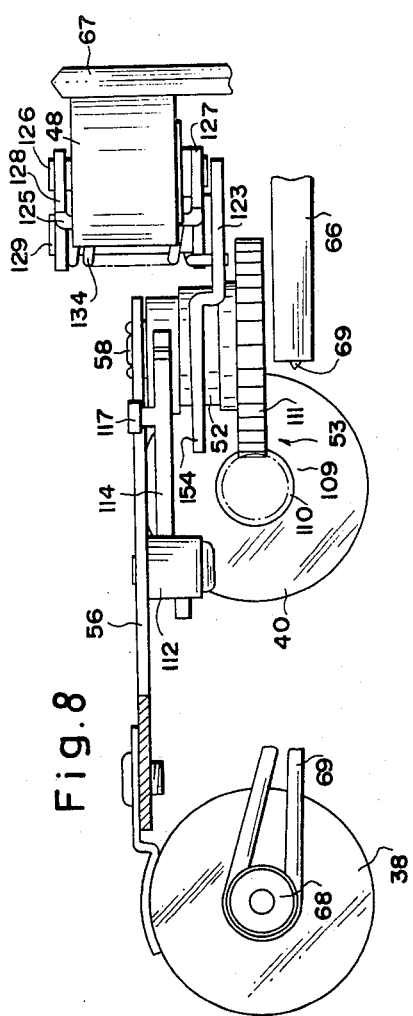
Fig. 8
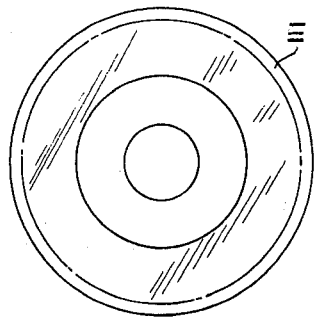
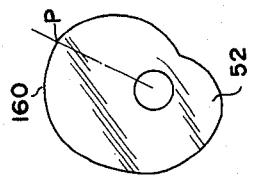
Fig. 11

TAPE RECORDER

BACKGROUND OF THE INVENTION

The present invention relates to a tape recorder, and more particularly to a tape recorder which includes a control motor in addition to a tape driving motor.

In a conventional tape recorder, in general, a support plate on which are mounted a head and a pinch roller is conjointly displaced with the sliding operation of a slide button or the pushing operation of a push button. With such a conventional construction, a comparatively large force must be exerted on the slide button or the push button. Thus, the mechanical construction of a support plate utilizing the force exerted on a slide button or a push button tends to being larger and more complex, thereby affecting the compactness of the tape recorder.

In order to overcome the drawbacks of a conventional tape recorder which utilizes a slide button or a push button as described above, a tape recorder which utilizes a control motor separate from the tape driving motor for controlling the support plate has been recently proposed. In a construction which utilizes a control motor, the support plate is biased by the press cam on a cam shaft, this press cam being rotated by the driving force of the control motor for controlling the forward or backward movement of the support plate. The forward and backward movement of the support plate effected by the press cam and the rotational movement of the control motor for driving the press cam must completely coincide in timing. However, the conventional construction has the drawbacks that such timing cannot be sufficiently controlled with a simple construction. Further, tape recorders which utilize a control motor have been applied only to open reel type tape recorders, and this technique thus is not applicable to cassette type tape recorders such as pocket-sized tape recorders.

SUMMARY OF THE INVENTION

It is therefore an object of the present invention to provide a tape recorder with a compact and simple construction which can fully control the timing of the forward and backward movement of a support plate and the rotational movement of a control motor. To this end, the present invention provides a control cam secured to a cam shaft for rotational movement with a press cam, thereby operating a control switch of the control motor.

The above and further objects and novel features of the present invention will more fully appear from the following detailed description when the same is read in connection with the accompanying drawing. It is to be expressly understood, however, that the drawing is for the purpose of illustration and is not intended as a definition of the limits of the present invention.

BRIEF DESCRIPTION OF THE DRAWING

FIG. 7 is a top plan view illustrating a modification of the tape driving mechanism;

FIG. 8 is a stepped side view along the line VIII—VIII of FIG. 4;

FIGS. 9 to 11 are, respectively, a front view, a top plan view and an exploded view illustrating the press cam, control cam and worm wheel, each secured to the cam shaft;

FIG. 12 is a rear view along the line XII—XII of FIG. 4;

FIG. 13 is a top plan view illustrating the relation of the head lever, the press cam and the control cam in the STOP, FF, or REW mode;

DETAILED DESCRIPTION OF THE PREFERRED EMBODIMENT

The preferred embodiment of the present invention will now be described with reference to the accompanying drawings. Although in this embodiment, the technical idea of the present invention is shown as applied to a cassette type tape recorder, it is to be understood that it is also applicable to open reel type tape recorders.

Figure 1:
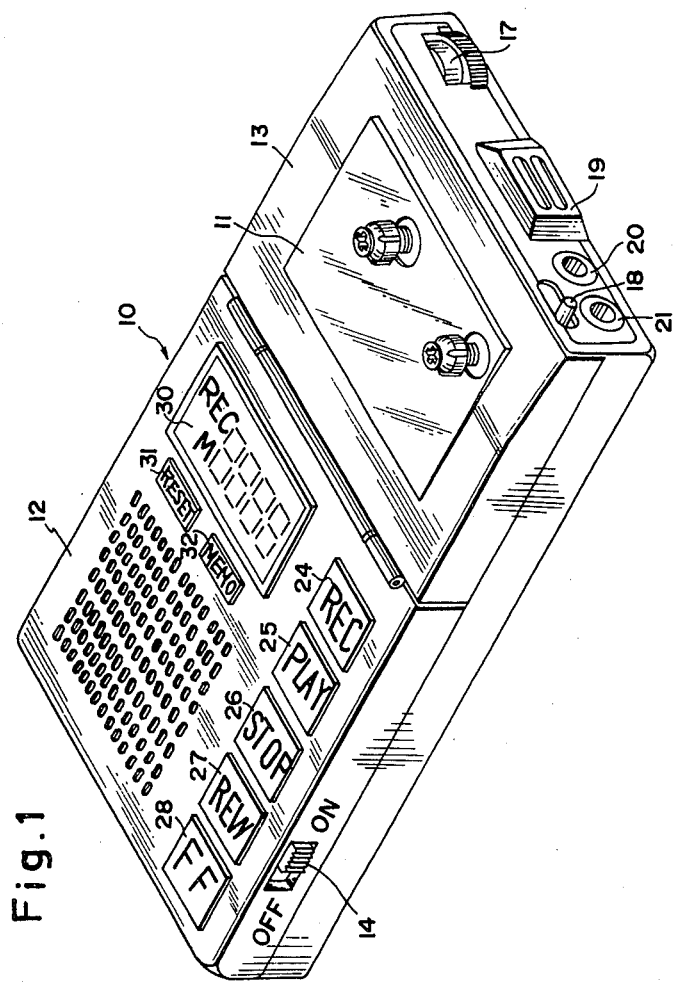
FIG. 1 is a perspective view illustrating the outer appearance of a tape recorder in accordance with one preferred embodiment of the present invention.

As shown in FIG. 1, the tape recorder 10 in accordance with the present invention comprises a recorder body 12 on which a cassette setting recess 11 is formed. The cassette setting recess 11 is covered with a hinged cover 13 which is capable of opening and closing. A main switch 14 is disposed on one side face of the recorder body 12; and a volume knob 17, a pause button 18, a condenser microphone 19, a microphone jack 20, and an earphone jack 21 are disposed on the upper end face of the recorder body 12. In a conventional tape recorder, in general, all the input is supplied through mechanical means such as a slide button or a push button. On the other hand, in the tape recorder 10 of the present invention, an electrical input is supplied to the LSI (large scale integrated circuit) through a touch switch of the keyboard so that control can be electrically effected by the LSI. REC, PLAY, STOP, REW, and FF touch switches 24 to 28 are disposed in a row on the top surface of the recorder body 12. A liquid phase display counter 30, a reset switch 31, and a memory switch 32 are also disposed on the upper surface of the recorder body 12.

Figure 2:
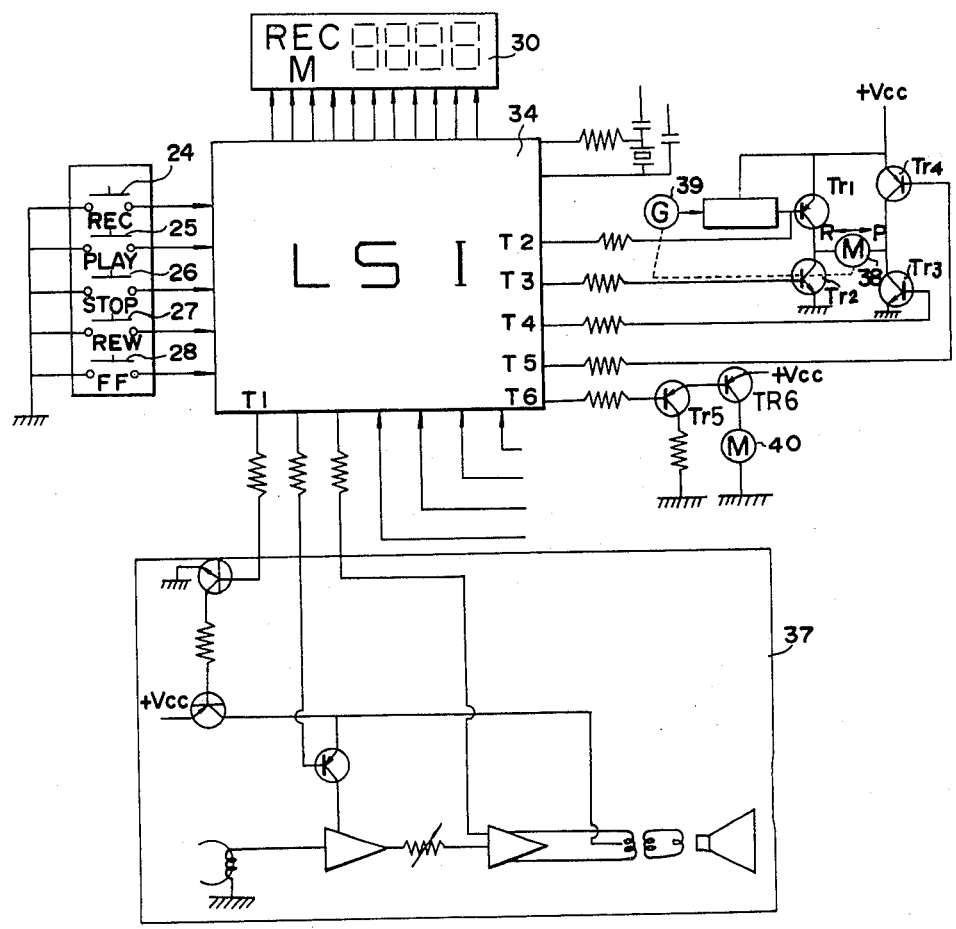
FIG. 2 is an electrical circuit diagram for a LSI.

The construction of the electrical system will now be described with reference to FIG. 2. The output level at the output end of a LSI 34 which responds to the operation of a touch switch fluctuates between a high level and a low level. For example, when the RECORD switch 24 or the PLAY switch 25 is depressed to turn it on, an output end T1 connected to a recording and reproduction amplifier system 37 is at a high level and the amplifier system 37 is conductive; the desired mode, that is, the recording or reproduction mode, is electrically set. On the other hand, when the STOP switch 26, the REW switch 27 or the FF switch 28 is turned on, the output end T1 is at a low level and the amplifier system 37 is nonconductive. In the recording, reproduction and FF modes, among output terminals T2 to T5 of the LSI 34, T2 and T3 are kept at a low level and T4 and T5 are kept at a high level so as to drive a tape driving motor 38. Then, among switching transistors Tr1 to Tr4, Tr1 and Tr3 are turned "on" and Tr2 and Tr4 are turned "off" so that current flows in the P(PLAY) direction. In the recording and reproduction modes, the number of revolutions of the motor is controlled by an electronic governor 39, and in the FF mode, the motor is capable of rotating at a high speed without being influenced by the electronic governor 39. In the REW mode, the output terminals T2 and T3 are at a high level and T4 and T5 are at a low level. The transistors Tr1 and Tr3 are then turned off and transistors Tr2 and Tr4 are turned on so that current flows in the R(REWIND) direction. Thus, the tape driving motor 38 rotates at a high speed without being influenced by the electronic governor 39.

A control motor 40 is arranged separately of the tape driving motor 38. The control motor 40 controls the forward and backward movement by rotating the press cam which contacts to a head support means in the form of, for example, a movable support plate on which a head and a pinch roller are mounted. The movable support plate and the press cam will be described hereinafter. When an output terminal T6 of the LSI 34 is at the low level, switching transistors Tr5 and Tr6 are turned on so as to rotate the control motor 40. As the control motor 40 rotates to rotate the press cam and the cam shaft through a predetermined angle, the support plate is displaced in a desired advanced position by the biasing force of a spring such that the magnetic head contacts on the tape and the pinch roller clamps the tape with the capstan shaft. When the support plate has been displaced to the desired position, the output terminal T6 is made to be at the high level to turn off the switching transistors Tr5 and Tr6 thereby interrupting the rotation of the control motor 40 and maintaining the recording or reproduction mode. Thereafter, when the STOP switch 26, for example, is depressed, the switching transistor T6 is at the low level to rotate the control motor 40. The press cam is thus rotated through a predetermined angle to displace the support plate so as to separate the pinch roller from the capstan shaft. Consequently, a mode change from the recording or reproduction mode to the STOP mode is accomplished. The rotation of the control motor 40 is thus controlled by the level change of T6.

Figure 3:
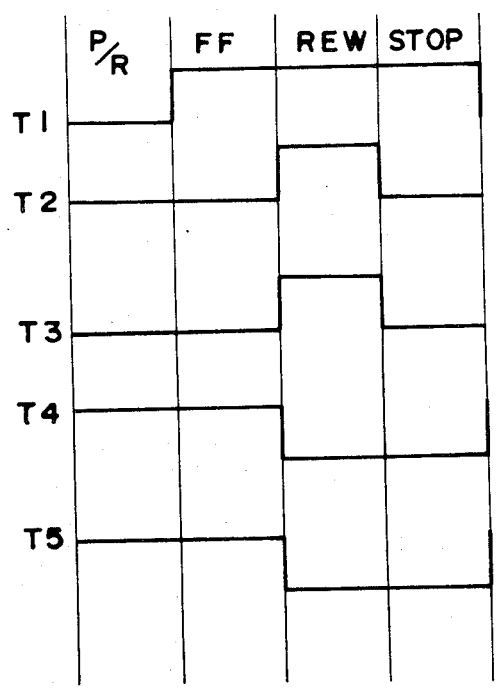
FIG. 3 is a time chart for each output terminal of the LSI.

In order to control the position of the support plate with precision, the control cam for operating the control switch for the control motor 40 is fixedly secured to the cam shaft together with the press cam as will be described hereinafter. Since the control cam is fixed to the cam shaft for united rotational movement, the opening and closing of the control switch by the control cam can be synchronized completely with the rotation of the press cam. Further, since the level change of T6 of the LSI is timed by the control switch, the movement of the support plate can be completely controlled. The time chart of the output levels of the terminals T1 through T5 in each operation mode is shown in FIG. 3. The output level at the output terminal T6 will be described hereinafter since it is associated with the opening and closing of the control switch. Each signal is supplied to the LSI 34 for generating an erroneous erasure alarm in association with the operation of the REC switch 24, for operating the tape end detection system or the tape counter in detecting the rotation of the magnetic ring, or for flashing to indicate a drop in voltage of the battery.

Figure 4:
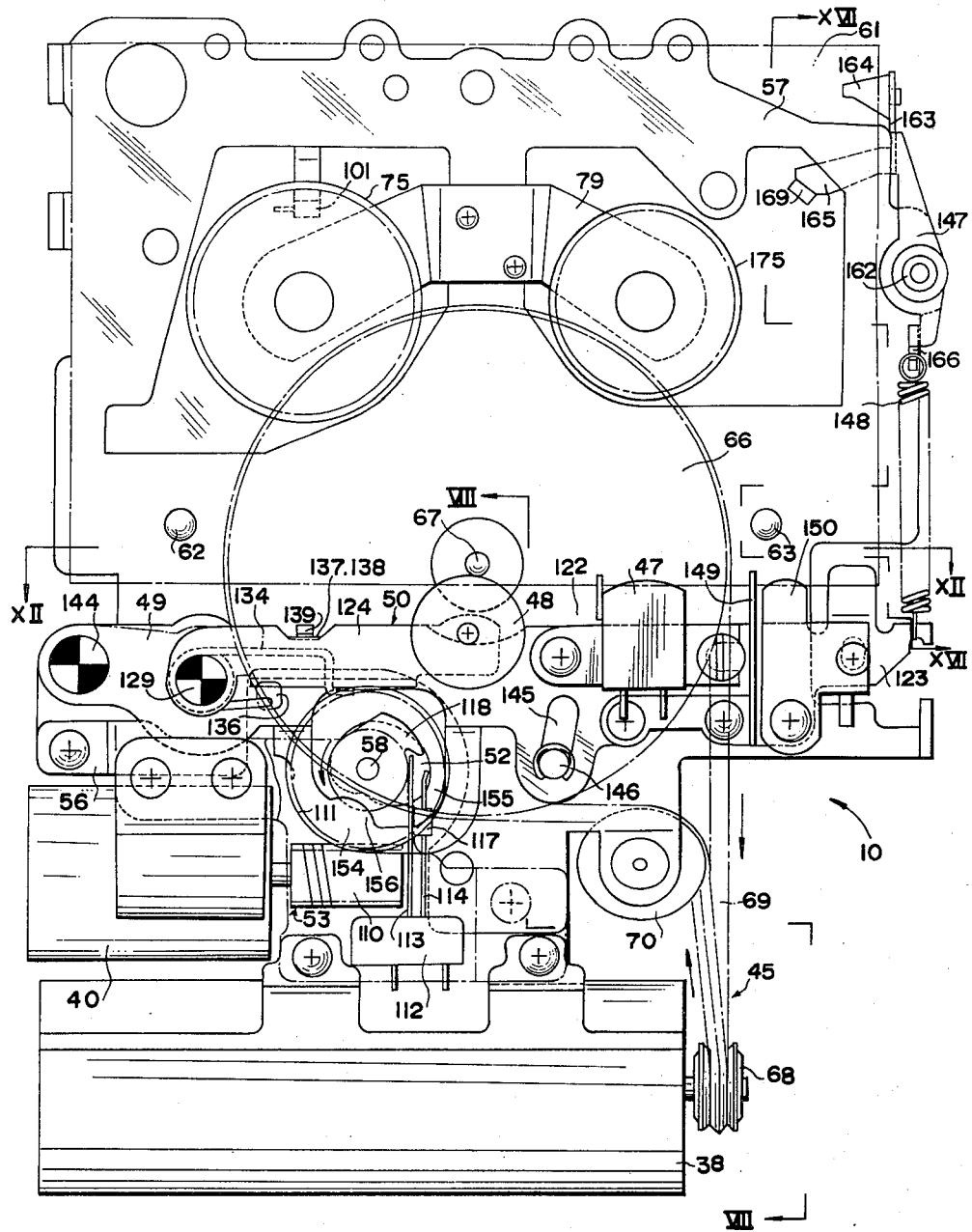
FIG. 4 is a schematic top plan view illustrating the internal structure of the tape recorder.

The mechanical construction of the tape recorder 10 will now be roughly described. As shown in FIG. 4, the tape recorder 10 comprises a tape driving mechanism 45 for transmitting the driving force of the tape driving motor 38 to a pair of reels for effecting tape run, a head support means 50 including a pivotable support plate 49 on which a recording and reproduction head 47, and a pinch roller 48 are mounted. The tape recorder 10 further comprises a cam driving mechanism 53 for transmitting the driving force of the control motor 40 to a press cam 52, which is pressed to the biased plate, so as to be rotated. The tape driving motor 38 and the control motor 40 are both secured by screws to a mounting plate 56 which is in the form of a bent plate. This mounting plate 56 is secured by screws to a stationary plate, that is, a base plate 57. A cam shaft 58 of the press cam 52 is rotatably mounted to the mounting plate 56. In FIG. 4, part of the mounting plate 56 is partially cut away for clearly illustrating the members located below it, and the cut away outline is shown by the one-dot chain line. A cassette 61 is guided by a pair of conical cassette guide pins 62 and 63 to be mounted in the cassette setting recess 11 (see FIG. 1).

The tape driving mechanism 45 will now be described in detail with reference to FIGS. 4 and 5. A capstan shaft 67 is mounted on the base plate 57, and a flywheel 66 is secured to the lower end of the capstan shaft. An endless driving belt 69 of rectangular cross section is interposed between the flywheel 66 located below the base plate 57 and a motor pulley 68 of the tape driving motor 38. The endless belt 69 is changed in its direction of travel and is kept tensed by an idler pulley 70 mounted on an extension bent slightly upwardly of the base plate 57. The idler pulley 70 is disposed on the loose side of the endless belt 69 in forward run (shown by the arrow) and the endless belt travels straightly in the tension side between the motor pulley 68 and the flywheel 66. Thus, the flywheel 66 can rotate at a constant speed. The driving force is transmitted from the capstan shaft 67 to reels 72 and 172 through gear trains. A capstan gear 73 is secured to the capstan shaft 67, and the driving force is transmitted from the capstan gear 73 through an intermediate idler gear 76 to reel gears 75 and 175 assembled in a reel mechanism 74. Accordingly, the reels 72 and 172 rotate in the same direction of rotation as the capstan shaft 67. However, in any of the operation modes, one of the reels 72 and 172 must be driven and the other must be free. In the recording, reproduction and FF modes when the tape is running in the forward direction, the reel 72 is driven and in the reverse run of the tape, such as in the REW mode, the reel 172 is driven. The reels 72 and 172 of the reel mechanism 74 therefore have one-way clutch means 78 and 178, respectively.

Figure 6:
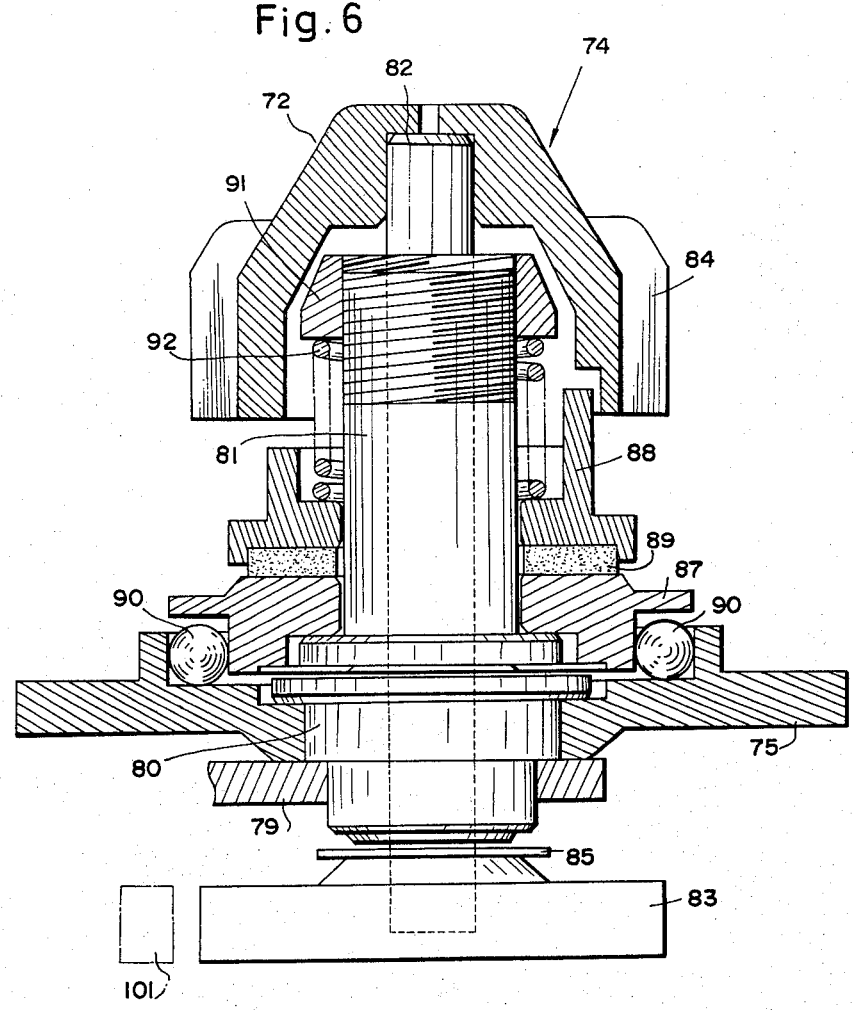
FIG. 6 is a partially longitudinal sectional view illustrating one reel of a reel mechanism of the tape recorder.

The construction and function of the reel 72 and the reel gear 75 which is of the driving side or the take-up side in the recording, reproduction and FF modes will now be described with reference to FIG. 6. The reel gear 75 is rotatably supported on the outer circumference of a reel bearing 80 mounted on a reel support plate 79 which in turn is secured to the base plate 57 (see FIG. 4). The support plate 79 may, however, be eliminated in which case the base plate 57 is bent and a reel bearing 80 is disposed on the bent portion of the base plate. A reel shaft 82 which fits in a reel collar 81 is loosely received in the reel bearing 80. A pulse-generating magnetic ring 83 with alternately arranged N and S poles is secured to the lower end of the reel shaft 82. A tape winding 84 is secured to the upper end of the reel shaft 82. The reference numeral 85 indicates a washer. The one-way clutch means 78 of the reel 72 has a reel cam 87 on the outer circumference of which three spiral notches are equiangularly formed, a reel felt plate 89 interposed between a reel spring receiving plate 88 into which fits the reel shaft 82 and the reel cam 87, and three steel balls 90 each disposed in one of the spiral notches of the reel cam. The reel spring receiving plate 88 is biased toward the reel felt plate 89 by the biasing force of a reel spring 92 which takes the form of a compression coil spring interposed between the lower surface of a reel screw 91 screwed into the threaded upper end of the reel collar 81 and the upper surface of the reel spring receiving plate.

Figure 5:
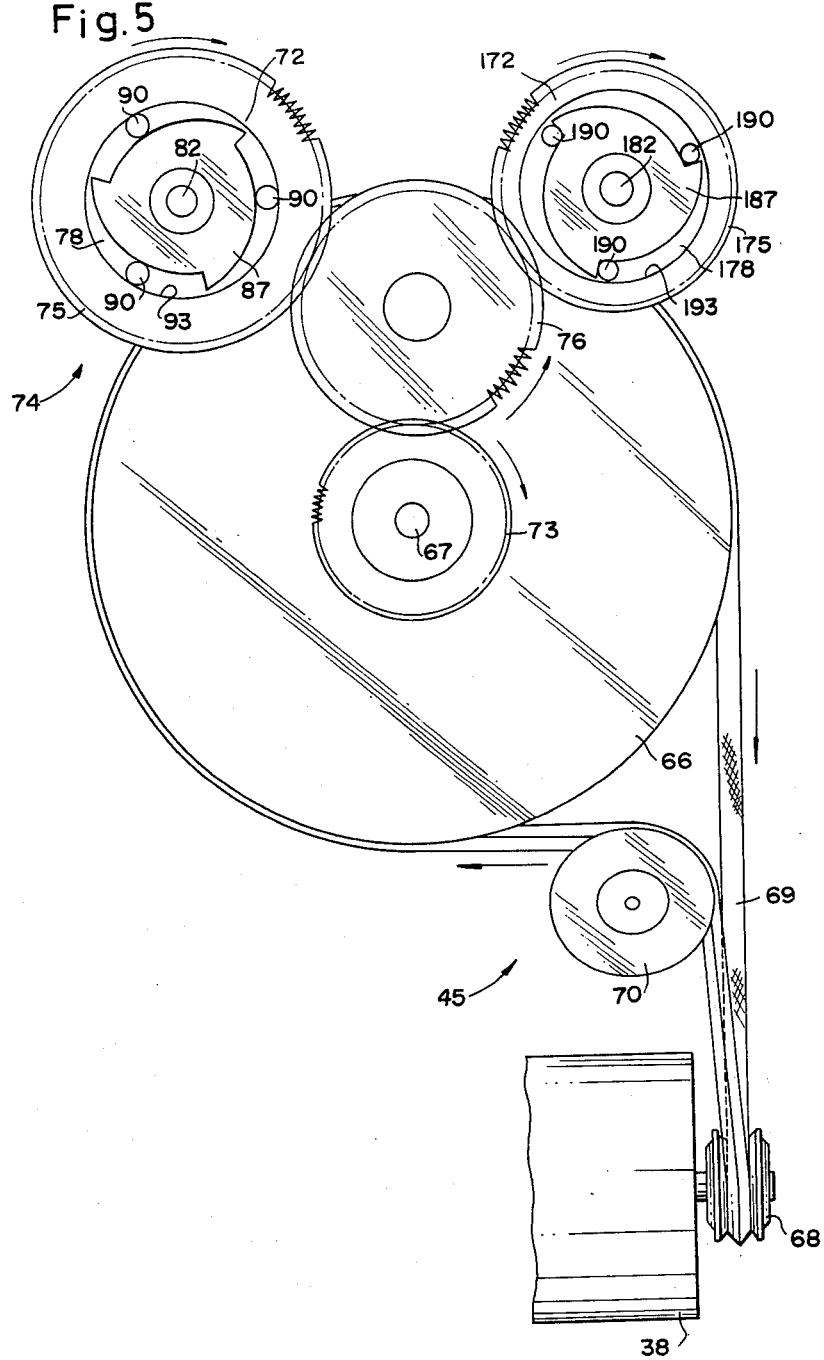
FIG. 5 is a top plan view illustrating the tape driving mechanism of the tape recorder.

As seen from FIG. 5, the steel balls 90 have such dimensions that they are able to move in the space defined by the inner circumference 93 of the reel gear 75 and the notches of the reel cam 87. The reel 172 which is at the driving side in the forward run of the tape is of the same construction, except that the direction of the spiral notches of a reel cam 187 is the reverse, and a reel stopper (not shown) is mounted instead of the magnetic ring 83 at the lower end of reel shaft 82. In the embodiment illustrated in the accompanying drawings, the reel gear 75 of the reel 72 is larger in diameter than the reel gear 175 of the reel 172. However, it is understood that they may be the same in diameter. The constituting members of the reel 172 are shown by reference numerals which are the reference numerals of the corresponding member of the reel 72 plus 100.

When the endless belt 69 is driven in the forward direction, that is, in the direction shown by the arrow in FIG. 5, the flywheel 66, the capstan 67 and the capstan gear 73 rotate in the clockwise direction of FIG. 5. Then the idler gear 76 rotates in the counterclockwise direction, and the reel gears 75 and 175 rotate in the clockwise direction. Referring to the reel 72 first, when the reel gear 75 rotates in the clockwise direction, the steel balls 90 move to the narrow space in the notches of the reel cam 87 due to contact with the inner circumference 93 of the reel gear 75. Consequently, each of the steel balls 90 serves as a wedge between the reel cam 87 and the reel gear 75. Thus, through these steel balls 90, a frictional force is generated between the inner circumference 93 of the reel gear 75 and the reel cam 87 to rotate the reel cam 87 in the clockwise direction. The driving torque of the reel cam 87, as seen from FIG. 6, is transmitted through the reel felt plate 89 to the reel spring receiving plate 88. Since the reel spring 92 is interposed between the reel spring receiving plate 88 and the reel screw 91, the driving torque is transmitted from the reel spring receiving plate 88 through the reel spring 92 to the reel screw 91. Since the reel screw 91 is threaded with the reel shaft 82 and the tape winding 84 fits with the reel shaft 82, the reel screw, the reel shaft and the tape winding rotate as a unit. As the tape winding 84 rotates with the reel shaft 82, the reel 72 effectively operates as the tape take-up reel in the recording, reproduction and FF modes.

In the reel 172, on the other hand, when the reel gear 175 rotates in the clockwise direction, as seen from FIG. 5, the steel balls 190 move to the wider space of the notches of the reel cam 187 by the contact with the inner circumference 193 of the reel gear 175 so that no wedging effect is obtained. Thus, the steel balls 190 slip between the inner circumference 193 of the reel gear 175 and the reel cam 187 so that no frictional force is generated. Consequently, no driving torque is transmitted from the reel gear 175 to the reel cam 187. The reel gear 175 thus slips and does not rotate the reel cam 187. Since the reel cam 187 does not rotate, no driving torque is generated to the reel screw and the reel shaft 182, and the reel 172 cannot thus serve as the tape take-up reel. As the tape is wound on the reel 72, the reel 172 is rotated by the tractive force of the tape. When the tape driving motor 38 is rotated in the reverse direction to move the endless belt 69 in this reverse direction, the reel gears 75 and 175 are rotated in the counterclockwise direction. The steel balls 90 then move toward the narrow space to generate a wedge action. The reel cam 187 and the reel gear 175 thus rotate in the counterclockwise direction. Then through a similar process as in the forward rotational movement of the reel cam 87, the reel screw and the reel shaft 182 rotate in the counterclockwise direction so that the reel 172 may be capable of serving as the tape take-up reel in the reverse run of the tape.

As described above, since each of the reels 72 and 172 of the reel mechanism 74 has the one-way clutch means 78 or 178, the driving torque is transmitted only to one of the reels 72 and 172 even when the pair of reel gear 75 and 175 are simultaneously rotated through the capstan gear 73 and the idler gear 76 of the tape driving mechanism 45. Therefore, the direction of the tape run, forward or reverse, can be easily set by rotating the single tape driving motor 38 in either direction. If a gear train including the capstan gear 73 etc. is used, the gear can be made thinner, and thermal deformation need not be considered. However, instead of the gear train including the capstan gear 73 and the reel gears 75 and 175, a capstan pulley 98 and reel pulleys 99 and 199 may be used and instead of the idler gear 76, an endless belt 100 may be disposed between these pulleys as shown in FIG. 7. A construction which does not use gears is advantageous in that it can be made simpler and may be manufactured at low cost. When the tape is running in the forward direction, constant rotation of the flywheel and, consequently, constant run of the tape can be obtained since the tape driving motor 38 and the flywheel 66 are directly connected by the endless belt at its tension side.

A magnetism sensitive element 101 is disposed adjacent to the pulse-generating magnetic ring 83 in which the N and S poles are alternately arranged. This magnetism sensitive element 101 senses the fluctuation in the pulse waveform of the magnetic ring and generates a signal which is used for tape end detection. The magnetic ring 83 need not always be mounted on the reel shaft 82 of the reel 72, it may be mounted on the reel shaft 182 of the reel 172.

As seen from FIGS. 4 and 8, the cam driving mechanism 53 has a gear train 109 which includes a gear mounted on the output shaft of the control motor 40, for example, a worm gear 110, and a worm wheel 111 which is mounted on the cam shaft 58 on the mounting plate 56 and which engages with the worm gear 110. The worm wheel 111 is secured to the lower end of the cam shaft 58, and the press cam 52 is secured to the cam shaft 58 upwardly of the worm wheel. A control switch 112 for the control motor 40, for example, in the form of a leaf switch is mounted on the rear surface of the mounting plate 56. The control switch 122 has a movable terminal 113 and a stationary terminal 114. A stopper 117 made of insulating material such as plastic is secured to the stationary terminal 114. The stopper 117 is biased toward the end face of the mounting plate 56 by the biasing force of the stationary terminal 114 itself which acts as a leaf spring (see FIG. 4). Thus, since the stopper 117 is biased toward the end face of the mounting plate 56, the position of the stationary terminal 114 can be correctly set. Then since the position of the stationary terminal 114 can be correctly set, the "ON" position of the control switch 112 can be controlled correctly. One of the movable terminal or the stationary terminal of the control switch 112 is grounded and the other terminal is connected to the LSI 34. A control cam 118 for deforming the movable terminal 113 of the control switch 112 and for putting it in contact with the stationary terminal 114 is secured to the upper end of the cam shaft 58 at the same level with the stationary terminal. This control cam 118 is made of plastic and is fixedly secured to the cam shaft 58.

As seen from FIG. 9, the worm wheel 111, the press cam 52, and the control cam 118 are fixedly secured in order on the cam shaft 58, they all rotate as a unit. The press cam 52 and the control cam 118 are shaped as shown in FIGS. 10 and 11. The angle between a point p of maximum projection of the press cam 52 and the operation starting point Q1 of the control cam 118 in which the movable terminal 113 is in contact with the stationary terminal 114 for turning on the control switch is determined by the relative positions of a projecting piece 119 of the support plate 49 to be described later and the control switch 112. Further, the angle between the operation starting point Q1 and an operation terminating position Q2 in which the movable terminal 113 is separated from the stationary terminal 114 to turn off the control switch is set in correspondence with the operation of the control motor 40.

Figures 12, 13:
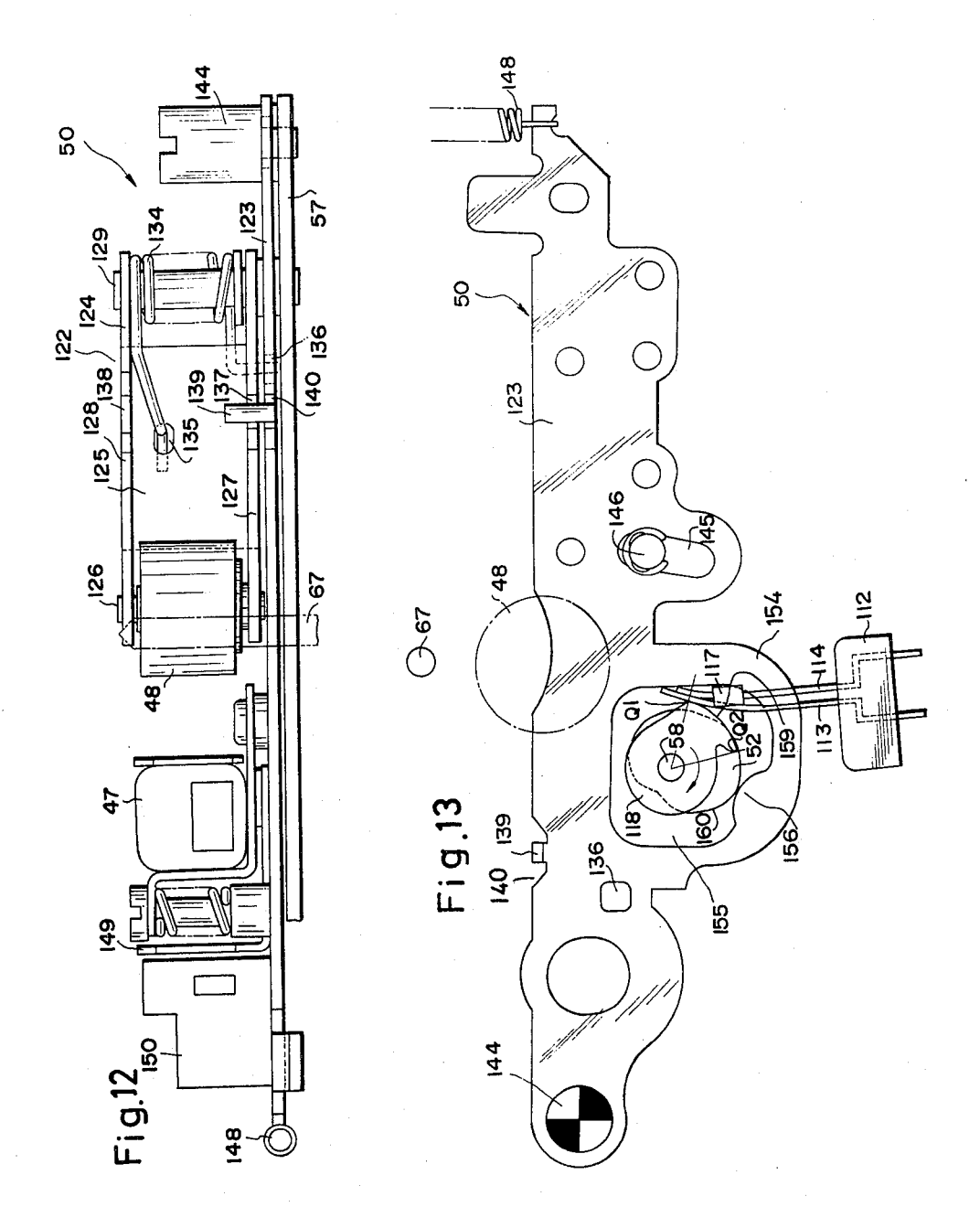

The head support means 50 for supporting the recording and reproduction head 47, the pinch roller 48 or the like, as shown in FIGS. 4 and 12, includes a support plate such as a support lever 122, on which the head 47 and the pinch roller 48 are mounted. In the embodiment shown in the drawings, the support lever 122 is constructed with a head lever 123 on which the head 47 is mounted and a pinch roller lever 124 which supports the pinch roller 48 and is disposed above the head lever. The pinch roller lever 124 is branched to have a vertical piece 125 and a pair of horizontal pieces 127 and 128 which are horizontally arranged for supporting a pinch roller shaft 126 at the upper and lower parts of the vertical piece. The pinch roller lever 124 is pivotably mounted on the head lever 123 by a pivot pin 129 extending through the horizontal pieces 127 and 128. The center of the pivotal movement of, for example, the pivot pin 129 will be shown by ⊙ for easier understanding. A torsion spring 134 surrounds the pivot pin 129, the upper end of the torsion spring engages with a hole 135 formed in the vertical piece 125, and the lower end of the torsion spring engages with a hole 136 formed in the head lever 123. Thus, the pinch roller lever 123 is biased in the counterclockwise direction of FIG. 4 around the pivot pin 129 by the biasing force of the torsion spring 134. Notches 137 and 138 are formed on the side faces at the cassette side of the horizontal pieces 127 and 128. A stopper piece 139 (see FIG. 13) engageable with the notch 137 of the lower horizontal piece 127 is formed in a notch 140 in the end face of the head lever 123 and is bent upwardly. Therefore, the pinch roller lever 123 is biased by the biasing force of the torsion spring 134 until the end face of the notch 137 contacts the stopper 139. The head lever 123 with the recording and reproduction head 47 mounted thereon is pivotably mounted on the base plate 57 by a pivot pin 144. An arc-shaped guide hole 145, having the pivot pin 144 as the center of pivotal movement, is formed in the head lever 123. A guide pin 146 mounted on the base plate 57 extends through this guide hole 145, and a clip ring is mounted at the upper end of the guide pin. A tension spring 148 is interposed between the free end of the head lever 123 and an erroneous erasure prevention lever 147 on the base plate 57 so as to bias the head lever in the counterclockwise direction of FIG. 4 around the pivot pin 144. In addition to the recording and reproduction head 47, a tape guide 149 adjacent to the recording and reproduction head and an electromagnetic erase head 150 are mounted on the head lever 123. The pinch roller lever 124 is interposed between the pivot pin 144 and the recording and reproduction head 47. As seen from FIGS. 4 and 8, the head lever 123 has a horizontal extension 154 located at substantially the same level as the press cam 52. As shown in FIG. 13, an elongated hole 155 is formed in this horizontal extension 154, and the cam shaft 58 extends through the horizontal extension. A press projection 156 extends from the horizontal extension 154 into the elongated hole 155.

Figure 14:
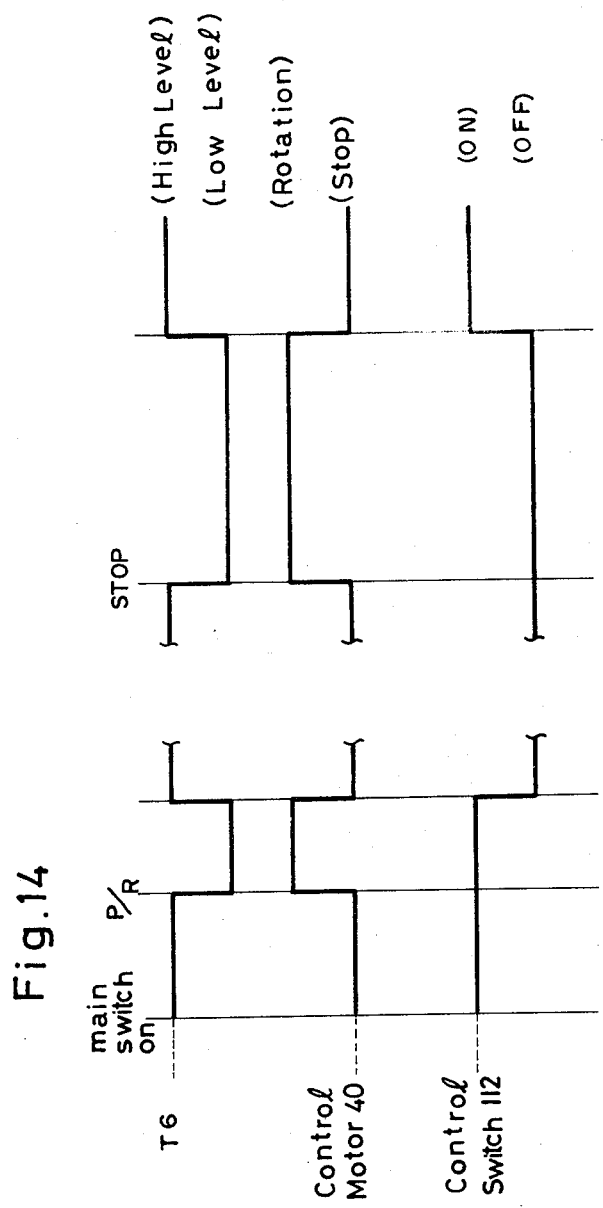
FIG. 14 is a time chart illustrating the control of the rotation of the control motor by a control switch.
Figure 15:
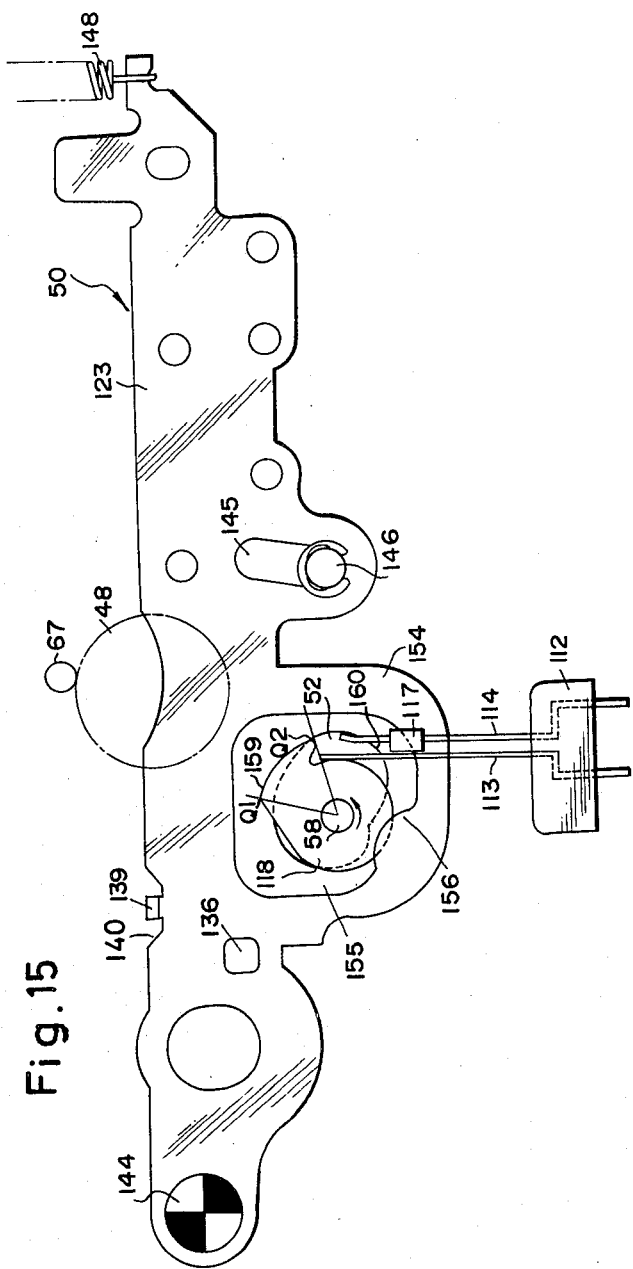
FIG. 15 is a top plan view illustrating the relation of the head lever, the press cam and the control cam in the recording or reproduction mode.

The operations of the head support means 50 and the cam driving mechanism 53 will now be described. Even when the cassette 61 is mounted in the cassette setting recess 11, since the press cam 52 is pressing the press projection 56 as shown in FIG. 13, the head lever 123 is so positioned, against the biasing force of the compression spring 148, that the pinch roller 48 is separated from the capstan shaft 67. When the main switch 14 (FIG. 1) is turned on, the output terminal T6 (FIG. 2) of the LSI 34 is at the high level and the control motor 40 will not yet rotate. The control switch 112 (FIG. 4) is kept off. When the PLAY switch 25 (FIG. 1) is depressed after the main switch 14 is turned on, the output terminal T6 of the LSI 34 is at the low level as shown in FIG. 14, and the control motor 40 starts rotating. Then, through the worm gear 110 and the worm wheel 111, the cam shaft 58 rotates. The press cam 52 and the control cam 118 formed integrally with the cam shaft 58 rotate with the cam shaft in the counterclockwise direction of FIG. 13. As the cam shaft 58, the press cam 52, and the control cam 118 rotate, the movable terminal 113 of the control switch 112 separates from cam face 159 between the operating points Q1 and Q2 of the control cam, the movable terminal separates from the stationary terminal 114 due to its own biasing force, and the control switch is turned off. When the control switch 112 is turned off by the control cam 118 as the cam shaft 58 rotates, the output terminal T6 of the LSI 34 is at the high level and interrupts the rotation of the control motor 40. As seen from FIG. 15, when the control motor 40 is not rotating, the press cam 52 does not press the press projection 156, and the head lever 123 is free with respect to the press cam. Since the head lever 123 is biased by the biasing force of the tension spring 148, it is guided by the guide pin 146 and is pivoted about the pivot pin 144 in the counterclockwise direction. The pivoted position of the head lever 123 is determined, as shown in FIG. 15, by the contact of the guide pin 146 with the extreme end of the guide hole 145. Since the pinch roller lever 124 on the head lever 123 is biased by the biasing force of the torsion spring 134, the pinch roller 48 is pressed to the capstan shaft 67. The notch 137 at the end face of the pinch roller lever 124 is pressed to the stopper piece 139 of the head lever 123 (FIG. 4). As the head lever 123 and the pinch roller lever 124 rotate in the counterclockwise direction and the pinch roller 48 is pressed to the capstan shaft 67, the end face of the notch 137 is separated from the stopper 139 and a small gap is formed therebetween. Thus, the pinch roller lever 124 for supporting the pinch roller 48 is formed separately of the head lever 123 for supporting the magnetic head 47 and the pinch roller lever is free from the head lever under the condition that the pinch roller 48 is in contact with the capstan shaft 67. Therefore, the pressing force of the pinch roller 48 on the capstan shaft 67 is determined by the biasing force of the torsion spring 134 alone. Accordingly, the pressing force of the pinch roller 48 can be correctly and constantly set. The condition shown in FIG. 15 shows the reproduction mode in which the tape is clamped between the pinch roller 48 and the capstan shaft 67. The mode change from the reproduction mode to, for example, the STOP mode is accomplished by depressing the STOP switch 26 (FIG. 1). As shown in FIG. 14, when the STOP switch 26 is depressed, the output of terminal T6 of the LSI 34 changes from the high level to the low level to rotate the control motor 40. As the control motor 40 rotates, the cam shaft 58, the press cam 52 and the control cam 118 rotate. A cam face 160 (FIG. 15) of the press cam 52 contacts the press projection 156 to rotate the head lever 123 in the clockwise direction about the pivot pin 144. When the head lever 123 is rotated to the point where the pinch roller 48 is fully separated from the capstan shaft 67, the movable terminal 113 of the control switch 112 is pressed to the cam face 159 of the control cam 118 as shown in FIG. 13, to make contact with the stationary terminal 114, and the control switch is turned on. When the control switch 112 is turned on, the output of terminal T6 of the LSI 34 changes from the low level to the high level as shown in FIG. 14, and the control motor 40 stops rotating. When the control motor 40 stops rotating, the head lever 123 returns to the STOP mode shown in FIG. 13. It is to be understood that the operation of the head lever 123 is the same in the recording and reproduction modes, another operation is common to the FF, REW and STOP modes. Cueing and reviewing can also be set by appropriately depressing switches.

As described above, the control cam 118 is secured to the cam shaft 58 to which is in turn secured the press cam 52 for unitary rotation of the press cam with the control cam so that the control cam opens and closes the control switch 112 of the control motor 40. When the control switch 112 changes from "on" to "off" or from "off" to "on", the output level of the terminal T6 of the LSI 34 changes to interrupt the rotation of the control motor 40. Accordingly, the forward and backward movement of the head support means 50 effected by the press cam 52 and the interruption of the control motor 40 effected by the control cam 118 are exactly timed so that the position of the head lever 123 can be precisely and completely controlled. Further, since the position of the head support means 50 is controlled by a single switch, the space occupied by the switch is small and only two terminals at the LSI side are required for the switch.

Figure 16:
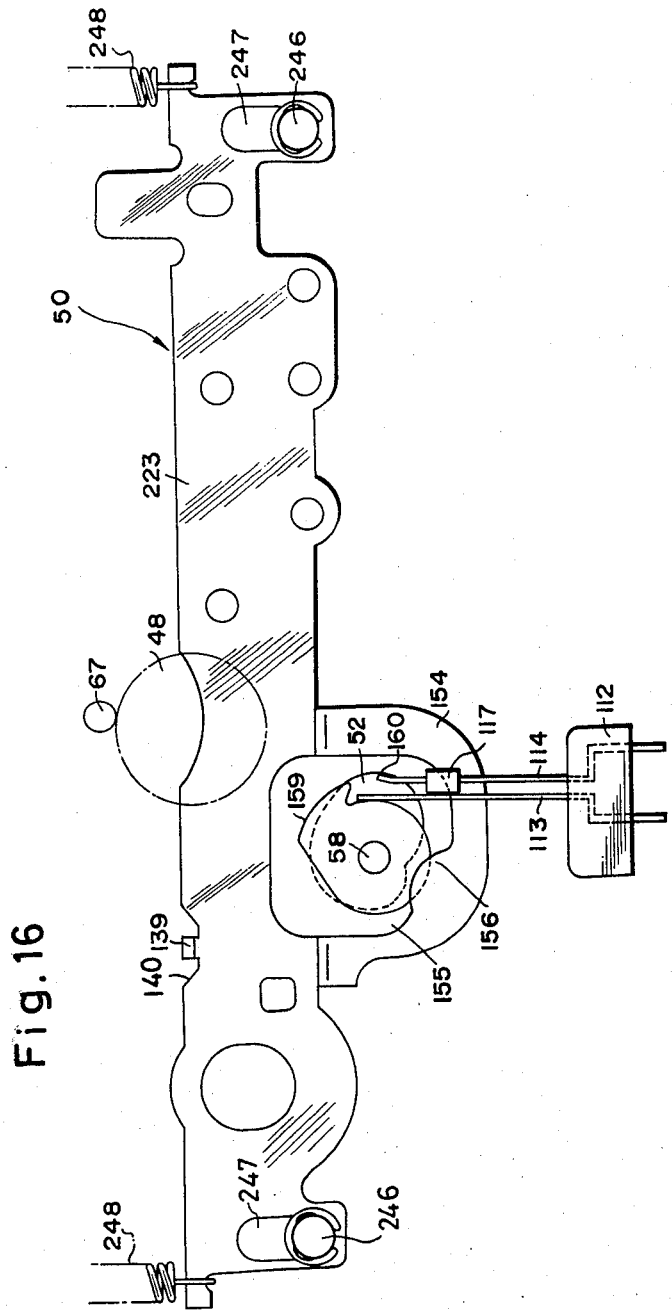
FIG. 16 is a top plan view illustrating a modification of the head lever.

In the embodiment shown in the drawings, the head lever 123 as the head support means 50 is biased by the biasing force of a single tension spring 148 and is so shaped that it is pivotable about the pivot pin 144. However, the head support means 50 is not limited to the form of a lever but can be a slide plate 223 which is biased by the biasing force of a pair of tension springs 248 and is slid by being guided by a pair of guide pins 246 and guide holes 247 as shown in FIG. 16.

Figure 17:
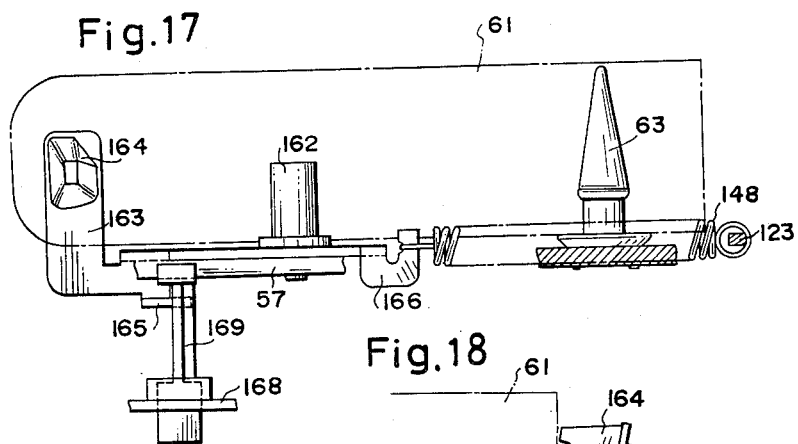
FIG. 17 is a stepped left side view along the line XVII—XVII of FIG. 4.
Figure 18:
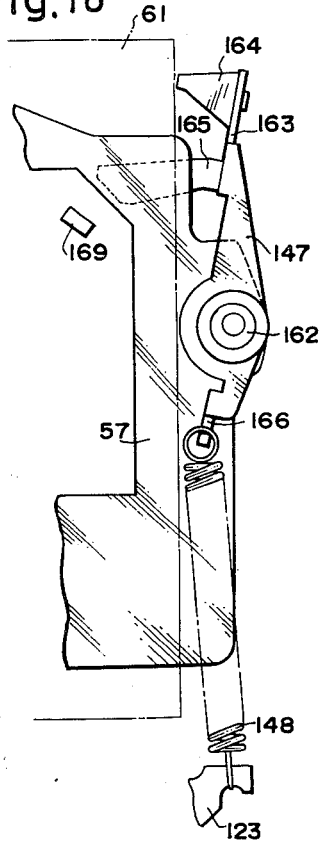
FIG. 18 is a top plan view illustrating an erroneous erasure prevention lever whose erroneous erasure prevention pawl is not removed.

The erroneous erasure prevention lever 147 is pivotably mounted to the base plate 57 by a pivot pin 162 as shown in FIGS. 17 and 18. One end of the lever 147 has an upper extension 163 on which an erroneous erasure prevention piece 164 made of plastic material is disposed. An operation piece 165 extends from the lower end of the upper extension 163 to below the base plate 57. A lower extension 166 is formed at the other end of the erroneous erasure prevention lever 147. The tension spring 148 is interposed between the free end of the head lever 123 and the lower extension 166. The upper extension 163 is biased toward the end face of the base plate 57 by the biasing force of the tension spring 148 as shown in FIG. 4. An erroneous erasure prevention contact piece 169 extends upwardly from a printed circuit board 168 located below the base plate 57.

Figure 19:
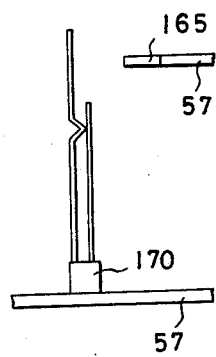
FIG. 19 is a partially side view illustrating an erroneous erasure prevention lever which uses a leaf switch instead of an erroneous erasure prevention contact piece.

With the conventional construction in which erroneous erasure of a recorded cassette tape is prevented with a bent erroneous erasure prevention pawl, the erroneous erasure prevention pawl enters the space where the erroneous erasure prevention pawl was, so as to allow a pivotal movement of the erroneous erasure prevention lever. Then the erroneous erasure prevention lever interferes with the path of movement of the REC button so that the REC button is incapable of being depressed. With such a conventional mechanical construction, if the REC button is depressed with a great force by accident, the erroneous erasure prevention lever may be deformed, resulting in misperformance. This construction is also disadvantageous in that the construction is complex. On the other hand, in the embodiment shown in the drawings, the tape recorder 10 does not have a mechanical member such as an REC button, so that the touch-type REC button 24 can be depressed at any time. In the embodiment shown in the drawings, if the erroneous erasure prevention pawl of the cassette 61 is bent and removed, the erroneous erasure prevention piece 164 is pressed by the end face of the cassette when it is mounted, it moves outwardly and thereafter enters the space where the erroneous erasure prevention pawl was by the biasing force of the tension spring 148. The operation piece 165 is also biased by the biasing force of the tension spring 148 and is pressed to the erroneous erasure prevention contact piece 169. Then the operation piece 165 and the erroneous erasure prevention contact piece 169 are electrically connected and grounded. In this grounded condition, the supply of current to the erase head 150 is interrupted, and the erase head becomes incapable of operating. Even when the touch-type REC switch 24 is depressed, an erroneousous erasure alarm operates by a known circuit so that the erroneous operation can be easily recognized. In the construction in which recording is electrically prevented by the ground due to contact between the erroneous erasure prevention contact piece 169 and the printed circuit board 168 which is connected to the operation piece 165 of the erroneous erasure prevention lever and to a recording circuit, there will be no chance of erroneous operation and the construction may be made simpler. As shown in FIG. 19, another construction may be adopted instead of the grounding method, in which a leaf switch 170 is used instead of the erroneous erasure prevention piece 169, and the erase head is rendered electrically inoperative by turning off this leaf switch. A single tension spring 148 interposed between the erroneous erasure prevention lever 147 and the head lever 123 provides the desired biasing force to the erroneous erasure prevention lever and the head support lever. In using the single tension spring 148 for more than one purpose in this manner, the number of required components can be decreased, and the manufacturing cost can be reduced. In case the erroneous erasure prevention pawl is not bent, the erroneous erasure prevention lever 147 is pressed to the end face of the cassette 61 and the erroneous erasure prevention piece 164 moves outwardly so that the lever 147 pivots in the clockwise direction against the biasing force of the tension spring 148 as shown in FIG. 18. Under this condition, the operation piece 165 is separated from the erroneous erasure prevention contact piece 169. Thus, they are not grounded, and the erase head can operate effectively. When the touch-type REC switch 24 is depressed, the recording mode can be effectively set.

As mentioned above, the tape recorder in accordance with the present invention comprises a control motor disposed separately of a tape driving motor and controlled by a control switch; a cam shaft to which the driving force of the control motor is transmitted; head support means for supporting a magnetic head, a pinch roller or the like which is movable between a first position in which the magnetic head is in contact with a magnetic tape and the tape is clamped between the pinch roller and the capstan shaft, and a second position in which the magnetic head is not in contact with the tape and the tape is not clamped between the pinch roller and the capstan shaft; biasing means for biasing the head support means toward the first position; and a press cam fixedly secured to the cam shaft and to which the head support means is biased by the biasing force of the biasing means. As the cam shaft rotates with the press cam, the position of the head support means is controlled against the biasing force of the biasing means. The tape recorder further comprises a control cam which is fixedly secured to the cam shaft and which changes over the control switch by rotating with the cam shaft and the press cam. Accordingly, since the control switch for the control motor is opened and closed by a control cam fixedly secured to the cam shaft for unitary rotation with the press cam, the forward and backward movement of the head support means and the rotational movement of the control motor can be correctly and easily timed with a simple construction so that the position of the head support means can be completely controlled.

What we claim is:

1. A tape recorder having a magnetic tape transport including a tape driving motor, the tape recorder further comprising:

a control motor disposed separately of the tape driving motor and controlled by the control switch;
   a cam shaft to which the driving force of the control motor is transmitted;
   a control switch having a movable element;
   head support means for supporting a magnetic head and a pinch roller, said head support means being movable between a first position in which the magnetic head is in contact with a magnetic tape loaded in the tape recorder and the tape is clamped between the pinch roller and the capstan shaft and a second position in which the magnetic head is not in contact with the tape and the tape is not clamped between the pinch roller and the capstan shaft;
   biasing means coupled to the head support means for biasing the head support means toward said first position thereof;
   a press cam which is fixedly secured to the cam shaft and toward which the head support means is biased by the biasing force of the biasing means, the press cam being arranged to move the head support means against the force of said biasing means;
   a control cam fixedly secured to the cam shaft and arranged to move the movable element of the control switch;
   said movable element of the control switch being arranged to press against the control cam such that rotation of the cam shaft simultaneously rotates the press cam and control cam to thereby respectively move the movable element to change over the control switch and move the head support means against the biasing force of the biasing means by the unitary rotation of the control cam and press cam with the cam shaft.

2. A tape recorder according to claim 1, wherein the control cam is mounted on the cam shaft in such a relation to the press cam that the head support means is in the first position thereof when the control switch is turned off to stop the control motor and is in the second position thereof when the control switch is turned on to stop the control motor.

3. A tape recorder according to claim 1 or 2, wherein:
   the control cam has a control cam face; and
   the control switch has a stationary terminal which in turn has a stopper made of an insulating material and in which the stationary terminal biases the stopper toward and in contact with a stationary member of the tape recorder; and the movable element of the control switch comprises a deformable movable terminal which is pressed to the cam face of the control cam and which is deformable by the control cam face to be pressed to contact the stationary terminal to close the control switch as the control cam rotates.

4. A tape recorder according to claim 1 or 2, comprising a gear train transmitting the driving force of the control motor to the cam shaft.

5. A tape recorder according to claim 4, wherein a motor pulley is coupled to be rotated by the control motor; and the gear train includes a worm gear coupled to the motor pulley of the control motor, and a worm wheel coupled to the cam shaft for engaging with the worm gear.

6. A tape recorder according to claim 1 or 2, wherein:
   the head support means includes a head support plate for supporting a magnetic head and a pinch roller support plate for supporting a pinch roller;
   the head support plate has a stopper thereon; and said tape recorder includes a pinch roller biasing means for biasing the pinch roller toward a capstan shaft of the tape recorder;

the pinch roller support plate being movably disposed on the head support plate and arranged such that it is pressed against the stopper formed on the head support plate by means of the biasing force of the pinch roller biasing means toward the capstan shaft and it is separated from the stopper of the head support plate when the head support plate is displaced to the first position.

7. A tape recorder according to claim 6, wherein the pinch roller support plate has a lever, one end of which supports the pinch roller and the other end of which is pivotably mounted on the head support plate.

8. A tape recorder according to claim 7, wherein the head support plate is in the form of a pivotable lever.

9. A tape recorder according to claim 7, wherein the head support plate is in the form of a slidable plate.

10. A tape recorder according to claim 1 or 2, which further comprises a plurality of touch-type switches; and LSI circuit electrically coupling the touch-type switches to the tape driving motor for controlling the rotation of the tape driving motor.

11. A tape recorder according to claim 10, wherein: the head support means includes an erase head and means for supporting the erase head; and the tape recorder further comprises an erroneous erasure prevention member electrically coupled to the erase head; and an erroneous erasure prevention lever having a free end, the lever having on its free end an erroneous erasure prevention piece which is insertable in a given space at which an erroneous erasure prevention tab of a cassette has been removed, and an operation piece arranged to contact the erroneous erasure prevention member when the erroneous erasure prevention piece enters the given space of the cassette, the erase head being rendered electrically inoperative when the operation piece and the erroneous erasure prevention member are in contact with each other.

12. A tape recorder according to claim 1 or 2, wherein the tape driving motor is a reversible motor, and further comprising a motor pulley coupled to the tape driving motor to be driven thereby, a capstan shaft arranged to drive the magnetic tape, a flywheel secured to the capstan shaft, an endless belt disposed between the motor pulley of the tape driving motor and the flywheel, and a direction change-over idler pulley disposed on a loose side of the belt when the tape is being driven to run in the forward direction.

* * * * *